United States Patent [19]

Saito

[11] Patent Number: 4,747,638

[45] Date of Patent: May 31, 1988

[54] VEHICLE SEAT

[76] Inventor: Tetsuo Saito, c/o Tachi-S Co., Ltd., 2-12, Matsubaracho 3-chome, Akishima-shi, Tokyo, Japan

[21] Appl. No.: 4,033

[22] Filed: Jan. 16, 1987

[51] Int. Cl.[4] .......................... A47C 7/18; A47C 31/02
[52] U.S. Cl. ..................................... 297/218; 297/452; 297/460; 297/DIG. 1
[58] Field of Search ............... 297/218, 452, 458, 459, 297/460, DIG. 1; 5/474, 481

[56] References Cited

U.S. PATENT DOCUMENTS

| | | | |
|---|---|---|---|
| 3,323,835 | 6/1967 | Barecki | 297/460 |
| 3,630,572 | 12/1971 | Homier | 297/218 X |
| 3,649,974 | 3/1972 | Baruth et al. | 297/458 X |
| 3,669,498 | 6/1972 | Meyers et al. | 297/460 X |
| 3,961,823 | 6/1976 | Caudill, Jr. | 297/DIG. 1 X |
| 4,579,388 | 4/1986 | Urai | 297/DIG. 1 X |
| 4,579,389 | 4/1986 | Shimbori et al. | 297/DIG. 1 X |

FOREIGN PATENT DOCUMENTS

| | | | |
|---|---|---|---|
| 2030094 | 4/1971 | Fed. Rep. of Germany | 297/452 |
| 2023803 | 12/1971 | Fed. Rep. of Germany | 297/452 |

Primary Examiner—Kenneth J. Dorner
Assistant Examiner—Peter R. Brown
Attorney, Agent, or Firm—Oldham, Oldham & Weber Co.

[57] ABSTRACT

A seat for use in a vehicle such as an automobile which comprises a trim cover assembly including a center portion having a fixed width, two side portions sewn to the sides of the center portion and margins produced when the two side portions are sewn to the center portion and projecting out on the back side of the trim cover assembly, and a pad member of foam material covered by the trim cover assembly and formed in the right and left portions of the surface thereof with two sets of recessed grooves into which the above-mentioned margins are inserted, the two sets spaced from each other at a distance equal to the width of the center portion of the trim cover assembly. Each of the recessed grooves has an opening cut wider in either portion thereof to be expanded so that, even when the surface of the pad member is formed uneven between the right and left sets of recessed grooves, the margins can be inserted into the recessed grooves.

6 Claims, 3 Drawing Sheets

VEHICLE SEAT

BACKGROUND OF THE INVENTION

1. Field of the Invention

The present invention relates to a seat used in a vehicle such as an automobile and, more particularly, to an improved vehicle seat which comprises a trim cover assembly including a center portion of a given width and two side bolster portions respectively sewn up to the two sides of the center portion with margins to sew up being projected on the rear side of the trim cover assembly, and a pad member of foam material covered by the trim cover assembly and having two sets of recessed grooves on the surface thereof spaced from each other at an interval equal to the width of the center portion of the trim cover assembly for insertion of the margins thereinto.

2. Description of the Prior Art

Conventionally, in a vehicle seat of this type, margins to sew up a central portion and two side bolster portions are inserted into recessed grooves formed in a pad member so that projections produced by the margins are prevented from coming out on the surface of the trim cover assembly.

However, as shown in a seat back (A) in FIG. 1, for example, in the case of a conventional seat back in which vertical patterns (10)(10) for decoration are arranged vertically in parallel to one another in a center portion (1a) of a trim cover assembly (1), the entire width (L) of the center portion (1a) is fixed. Therefore, when two side bolster portions (1b)(1b) are sewn up to the two sides of the center portion (1a) to provide the trim cover assembly (1), then there are produced two sew-up margins (11)(11) on the ends of the these portions and the distance between the right and left margins (11)(11) is fixed, that is, equal to the entire width (L) of the center portion (1a). In the drawings, reference numeral (1c) designates a gore portion.

On the other hand, on the surface of a foam pad member (2) which is to be covered by the above-mentioned trim cover assembly (1), there are formed two right and left sets of recessed grooves (21a)(21b)(21c) at a distance equal to the width of the center portion (1a) of the trim cover assembly (1) so that the right and left margins (11)(11) projected out from the back side of the trim cover assembly (1) can be inserted into the recessed grooves (21a)(21b)(21c). These recessed grooves (21a)(21b)(21c) arranged vertically on the right and left portions of the pad member (2) are formed in a substantially U-shaped configuration, respectively.

When the above-mentioned trim cover assembly (1) is placed over the thus formed surface of the pad member (2) to assemble the seat back (A), then there is obtained such a structure as shown in FIGS. 3 through 5.

Specifically, when a hang cloth (5) is sewn to the center portion (1a) of the trim cover assembly (1) and the center portion (1a) is then hung in by the hung cloth (5), then in the portions of the center portions (1a) hung in by the hang cloth (5), the margins (11)(11) can be inserted into the recessed grooves (21b)(21b) as shown in FIG. 5, but in the portions of the center portions (1a) located upwardly of the hung-in portions, as shown in FIG. 4, the margins (11)(11) are slipped outwardly of the recessed grooves (21c)(21c) respectively, while in the portions thereof located downwardly of the hung-in portions, as shown in FIG. 3, the margins (11) (11) are slipped inwardly of the recessed grooves (21c)(21c) respectively, so that the margins (11)(11) can not be inserted into the recessed grooves (21c)(21c)—. In other words, if the surface of the pad member (2) between the recessed grooves (21c)(21c) is flat, then the center portion (1a) is pulled in the right and left directions thereof so that such a state as shown in FIG. 4 is produced. Also, if, as shown in FIG. 3, the surface of the pad member (2) between the recessed grooves (21c)(21c) is uneven, that is, goes up and down alternately, then the central portion (1a) is drawn into the insides of the portions between the ups and downs of the pad member surface.

In the drawings, reference character (3) designates a frame and (4) represents a spring member such as an S spring for supporting the above-mentioned pad member (2).

SUMMARY OF THE INVENTION

The present invention aims at eliminating the drawbacks found in the above-mentioned prior art seat.

Accordingly, it is an object of the invention to provide an improved vehicle seat including a trim cover assembly having a center portion of a fixed width and a pad member formed on the surface thereof with recessed grooves for insertion thereinto of margins produced when the center portion and two side bolster portions are sewn up together, wherein the margins are wholly inserted into the recessed grooves respectively to eliminate thereby the possibility that any raised or projected portions may be produced on the surface of the trim cover assembly due to the presence of the margins.

In accomplishing the above object, according to one aspect of the invention, each of the recessed grooves in the pad member is defined to have an opening expanded on one of the right and left, namely, inward and outward sides thereof. Specifically, if the pad has a flat surface between the right and left sets of recessed grooves, then the opening of each of the recessed grooves is enlarged wider in a direction outwardly of the pad member (2). With one side being at about a 90° angle to the bottom of the groove, the outward side is at an oblique angle, if the surface of the pad is uneven, namely, goes up and down alternately between the right and left sets of recessed grooves, then the groove opening is enlarged wider in a direction inwardly of the pad member (2). That is the inward side is at an oblique angle and the outer side is at about a 90° angle.

Therefore, due to the formation of the enlarged opening in each of the recessed grooves, the margins produced when sewing up the trim cover assembly can be completely inserted into the recessed grooves, respectively, thereby eliminating the possibility that the margins may give rise to projections on the surface of the trim cover assembly as in the above-mentioned prior art seat.

BRIEF DESCRIPTION OF THE DRAWINGS

The above and other objects and features of the invention will appear more fully hereinafter from a consideration of the following description taken in connection with the accompanying drawings in which.

DETAILED DESCRIPTION OF A PREFERRED EMBODIMENT OF THE INVENTION

In FIGS. 6 through 10, there is illustrated a seat back for use in an automotive seat according to the invention.

Figure 1:
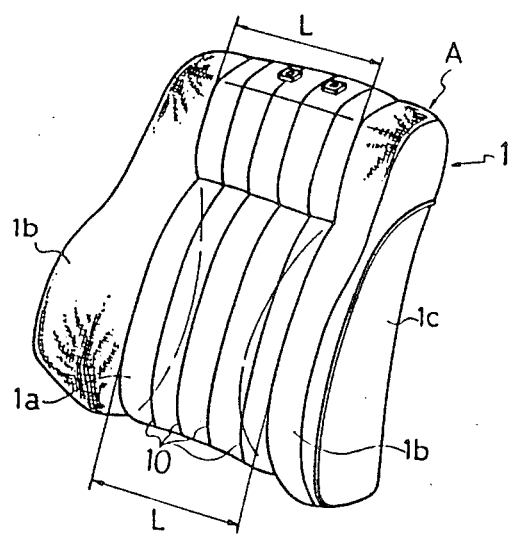
FIG. 1 is a perspective view of a conventional seat back of a vehicle seat.
Figure 2:
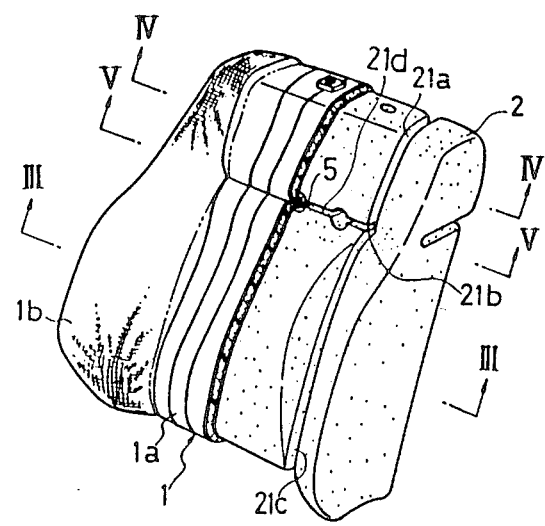
FIG. 2 is a partially cutaway, perspective view of the same seat back.
Figure 3:
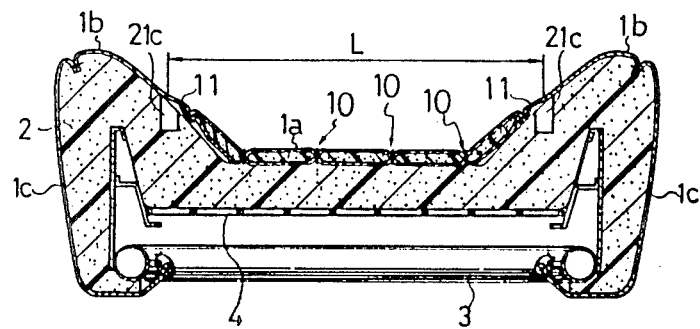
FIG. 3 is a section view taken along the line III—III in FIG. 2.
Figure 4:
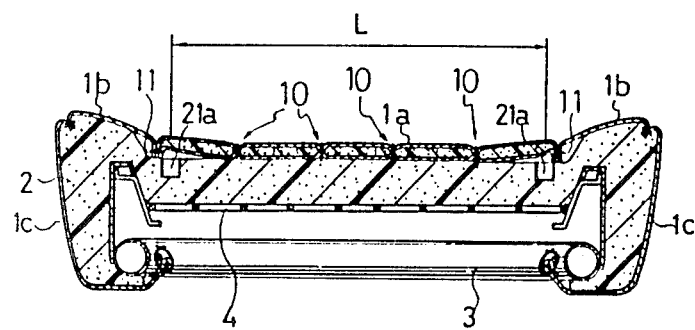
FIG. 4 is a section view taken along the line IV—IV in FIG. 2.
Figure 5:
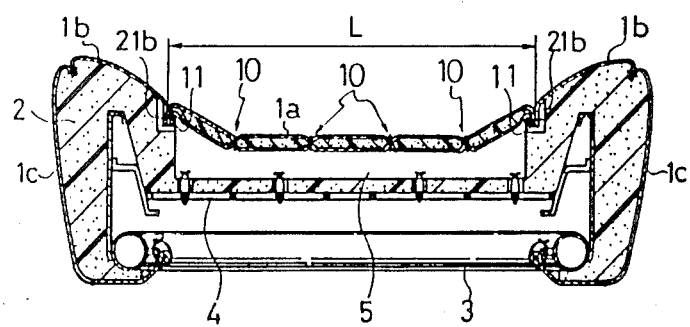
FIG. 5 is a section view taken along the line V—V in FIG. 2.
Figure 6:
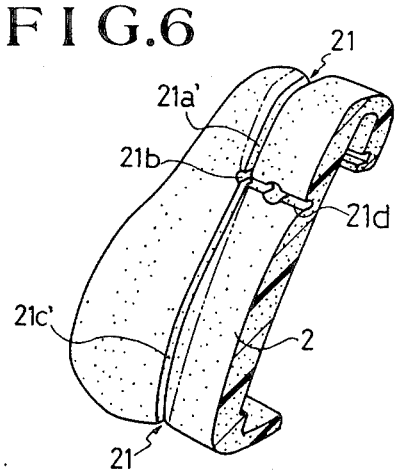
FIG. 6 is a partially cutaway, perspective view of a pad member employed in the invention.
Figure 8:
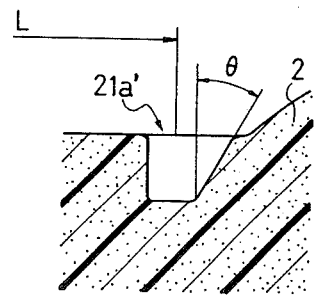
FIG. 8 is a partially enlarged section view of the above pad member in FIG. 7.

In FIG. 6, there is shown a pad member (2) employed in the present invention. The pad member (2), as in the above-mentioned conventional seat, is formed with recessed grooves (21) (only one set of recessed grooves are shown) spaced from each other at a distance (L) equal to the width of a center portion (1a) of a trim cover assembly (1). A recessed groove (21a') disposed upwardly of a position where a hang cloth (5) of the trim cover assembly (1) is provided is formed as shown in FIG. 8. That is, the recessed groove (21a') is cut in such a manner that it is expanded outwardly by an angle of $\theta$ with respect to the conventional recessed groove (21a).

Figure 10:
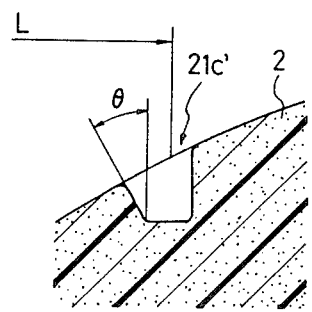
FIG. 10 is a partially enlarged section view of the pad member in FIG. 9.

Also, a recessed groove (21c') located downwardly of the above-mentioned position, as shown in FIG. 10, is formed such that it is expanded inwardly by an angle of $\theta$ with respect to the prior art recessed groove (21c).

Figure 7:
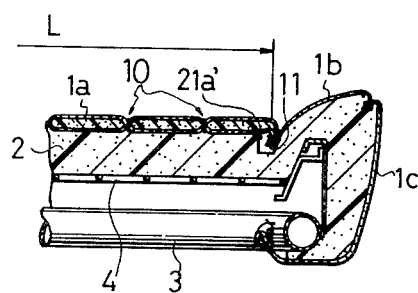
FIG. 7 is a section view of an upper portion of the above pad member shown in FIG. 6.
Figure 9:
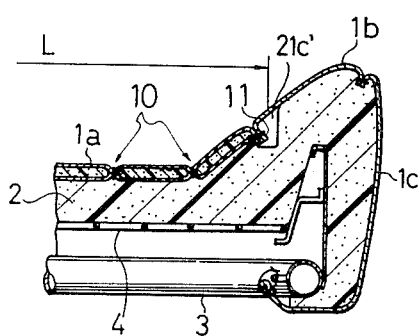
FIG. 9 is a section view of a lower portion of the above pad member.

In other words, since the recessed grooves (21c'), (21a') are respectively cut wider in the openings thereof than the prior art, as shown in FIG. 7 and 9, margins (11) produced when the center portion (1a) and side bolster portions (1b) of the trim cover assembly (1) are respectively inserted into the recessed grooves (21a')(21c') respectively provided with the expanded openings.

Another recessed groove (21d), into which the hang cloth (5) is inserted, is formed in a substantially U-shaped configuration.

The trim cover assembly (1) for covering the thus constructed pad member (1) is composed of the center portion (1a), side bolster portions (1b)(1b) and gore portions (1c)(1c) which are sewn together in a manner similar to the prior art.

Accordingly, the present invention can be obtained by cutting wider the inward or outward portions of the recessed grooves (21a)(21c) formed in the conventional pad member (2).

The above-mentioned center portion (1a) is formed by putting an upper layer composed of a textile fabric, synthetic leather or the like, an intermediate layer composed of a wadding of foam material (slab material), and a lower layer composed of an unwoven cloth on one another, and then sewing these three layers together in the longitudinal direction thereof by means of a sewing machine. The portions sewn by the sewing machine provide the above-mentioned decorative patterns (10)(10)—.

Each of the above-mentioned side bolster portions (1b)(1b) is formed of a single piece of a textile fabric or synthetic resin leather.

In FIGS. 6 through 10, the same reference characters as in FIGS. 1 through 5 mentioned above designate the same parts and thus the description thereof will be omitted here.

As has been described hereinbefore, according to the invention, simply by cutting wider the inward or outward side portions of the openings of the recessed grooves formed in the conventional pad member, the margins produced when the center portion and side bolster portions of the trim cover assembly are sewn together can be inserted into the expanded recessed grooves, respectively.

Therefore, in the invention, there is eliminated the possibility that, as in the above-mentioned conventional vehicle seat, the margins may go out of their associated recessed grooves to provide projections on the surface of the trim cover assembly, or the center portion of the trim cover assembly can not brought into close contact with the surface of the pad member to rise from the pad member surface. For this reason, when compared with the conventional vehicle seat, the invention can provide a vehicle seat which is improved in appearance and is uniform in quality.

What is claimed is:

1. A seat for use in a vehicle, comprising: a trim cover assembly including a center portion having a fixed width, two side bolster portions respectively sewn to the two sides of said center portion, and margins produced when said two side bolster portions are sewn to said center portion and extending projectingly in and from the back side of said trim cover assembly; and a pad member formed of foam material, covered by said trim cover assembly, and including on the surface thereof two sets of recessed grooves disposed respectively in the right and left portions of said surface, extending longitudinally of said surface, and spaced from each other at a distance equal to said fixed width of said center portion of said trim cover assembly, in which each of said recessed grooves has one side of said groove being perpendicular to the bottom of the groove and a second side of said groove being oblique relative thereto, said oblique sides allowing the margins to be easily inserted into said recessed groove in said pad member.

2. A seat for use in a vehicle as set forth in claim 1, wherein, when said surface of said pad member is flat between said right and left sets of recessed grooves, wherein said oblique sides of said recessed grooves are in the outward direction of said pad member.

3. A seat for use in a vehicle as set forth in claim 1, wherein, when said pad member surface is uneven between said right and left sets of recessed grooves, wherein said oblique sides of said recessed grooves are in the inward direction of said pad member.

4. A seat for use in a vehicle as set forth in claim 1, wherein said trim cover assembly includes in a portion of the back surface thereof a hang cloth extending in a transverse directionof said trim cover assembly, and said hang cloth is inserted into a recessed groove formed transversely on said surface of said pad member and is secured to a support member supporting said pad member.

5. A seat for use in a vehicle as set forth in claim 1, wherein said center portion forming a part of said trim cover assembly is provided with decorative patterns extending longitudinally of said center portion.

6. A seat for use in a vehicle as set forth in claim 1, wherein said center portion of said trim cover assembly comprises a three-layer structure including two pieces of upper and lower cloth and a foam wadding interposed therebetween, and each of said side bolster portions is formed of a single layer of cloth.

* * * * *

UNITED STATES PATENT AND TRADEMARK OFFICE
CERTIFICATE OF CORRECTION

PATENT NO. : 4,747,638

DATED : May 31, 1988

INVENTOR(S) : Tetsuo Saito

It is certified that error appears in the above—identified patent and that said Letters Patent is hereby corrected as shown below:

First Page, Left Column, Item 73 should read

--[73]  Assignee:  Tachi Co., Ltd., Tokyo, Japan--.

Signed and Sealed this

Twenty-second Day of August, 1989

Attest:

DONALD J. QUIGG

Attesting Officer

Commissioner of Patents and Trademarks